United States Patent
Bhaduri (10) Patent No.: US 11,444,831 B2
(45) Date of Patent: Sep. 13, 2022

(54) METHODS, SYSTEMS, AND COMPUTER READABLE MEDIA FOR MEASURING SCHEDULE UPDATE TIME FOR A TIME AWARE SHAPER IMPLEMENTATION

(71) Applicant: Keysight Technologies, Inc., Santa Rosa, CA (US)

(72) Inventor: Tanuman Bhaduri, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/746,087

(22) Filed: Jan. 17, 2020

(65) Prior Publication Data
US 2021/0226843 A1 Jul. 22, 2021

(51) Int. Cl.
*H04L 41/0806* (2022.01)
*H04L 43/08* (2022.01)
*H04L 43/50* (2022.01)
*H04L 47/28* (2022.01)
*H04L 47/32* (2022.01)

(52) U.S. Cl.
CPC ......... *H04L 41/0806* (2013.01); *H04L 43/08* (2013.01); *H04L 43/50* (2013.01); *H04L 47/28* (2013.01); *H04L 47/32* (2013.01)

(58) Field of Classification Search
CPC ..... H04L 41/0806; H04L 43/08; H04L 43/50; H04L 47/28; H04L 47/32
See application file for complete search history.

(56) References Cited

U.S. PATENT DOCUMENTS

| 7,272,750 B2 | 9/2007 | Sirbu |
| 9,288,777 B2 | 3/2016 | Hollabaugh et al. |
| 10,425,321 B2 | 9/2019 | Joseph et al. |

(Continued)

FOREIGN PATENT DOCUMENTS

| CN | 101631080 A | 1/2010 |
| CN | 101854268 A | 10/2010 |

(Continued)

OTHER PUBLICATIONS

Jiang, Junhui, Li, Yuting, Hong, Seung Ho, Xu, Aidong, Wei, Min, "A Simulation Model for Time-sensitive Networking (TSN) with Experimental Validation" Oct. 17, 2019, https://ieeexplore.ieee.org/document/8869206 (Year: 2019).*

(Continued)

*Primary Examiner* — Scott B Christensen (57) ABSTRACT

A method for measuring a schedule update time of a time aware shaper DUT includes configuring the DUT with a first configuration that blocks traffic from at least one gate of the DUT. The method further includes transmitting traffic from an emulated talker to an emulated listener via the DUT. The method further includes confirming blocking of the traffic from the at least one gate of the DUT and transmitting a second configuration from an emulated CNC node to the DUT, where the second configuration opens the at least one gate of the DUT, recording a time T1 of transmission of the second configuration to the DUT, detecting traffic from the at least one gate of the DUT at the listener, recording a time T2 of receipt of the traffic at the listener, and calculating a response time of the DUT to the second configuration based on T1 and T2.

19 Claims, 7 Drawing Sheets

(56) References Cited

U.S. PATENT DOCUMENTS

| | | | |
|---|---|---|---|
| 10,623,297 B2 | 4/2020 | Regev | |
| 2002/0065929 A1 | 5/2002 | Kamentsky et al. | |
| 2013/0138800 A1* | 5/2013 | Gelter | H04L 12/1881 709/224 |
| 2014/0269337 A1 | 9/2014 | Gintis | |
| 2014/0304505 A1 | 10/2014 | Dawson | |
| 2014/0321285 A1 | 10/2014 | Chew et al. | |
| 2015/0103828 A1 | 4/2015 | Chandhoke et al. | |
| 2015/0103832 A1 | 4/2015 | Chandhoke et al. | |
| 2015/0103836 A1 | 4/2015 | Chandhoke et al. | |
| 2015/0103848 A1 | 4/2015 | Chandhoke et al. | |
| 2015/0245306 A1 | 8/2015 | Boehlke | |
| 2015/0365255 A1* | 12/2015 | Gunther | H04L 65/1069 370/401 |
| 2017/0331748 A1 | 11/2017 | Mangin | |
| 2018/0070373 A1 | 3/2018 | Muench | |
| 2018/0160424 A1 | 6/2018 | Cavalcanti et al. | |
| 2018/0184438 A1 | 6/2018 | Cavalcanti et al. | |
| 2018/0191642 A1 | 7/2018 | Biederman et al. | |
| 2018/0227067 A1 | 8/2018 | Hu et al. | |
| 2018/0237039 A1 | 8/2018 | Mong et al. | |
| 2018/0302330 A1 | 10/2018 | Bush | |
| 2018/0302331 A1 | 10/2018 | Bush | |
| 2018/0309655 A1 | 10/2018 | Joseph et al. | |
| 2018/0309656 A1 | 10/2018 | Regev | |
| 2018/0316592 A1 | 11/2018 | Ellegaard | |
| 2019/0386924 A1 | 12/2019 | Srinivasan et al. | |
| 2020/0067792 A1 | 2/2020 | Aktas et al. | |
| 2020/0120029 A1 | 4/2020 | Sankaran et al. | |
| 2020/0304429 A1* | 9/2020 | Marce | H04L 49/90 |
| 2020/0326971 A1 | 10/2020 | Yang | |
| 2020/0366588 A1 | 11/2020 | Bergeron | |
| 2020/0366608 A1 | 11/2020 | Pan et al. | |
| 2021/0072373 A1* | 3/2021 | Schoenberg | G01S 13/878 |
| 2021/0112002 A1 | 4/2021 | Pan et al. | |

FOREIGN PATENT DOCUMENTS

| | | |
|---|---|---|
| CN | 108737003 A | 11/2018 |
| DE | 10 2018 109 689 A1 | 10/2018 |
| EP | 3396910 A1 | 10/2018 |
| WO | 2017082779 A1 | 5/2017 |

OTHER PUBLICATIONS

Hackel, Timo, Meyer, Philipp, Korf, Franz, Schmidt, Thomas C., "SDN4CoRE: A Simulation Model for Software-Defined Networking for Communication over Real-Time Ethernet", Aug. 26, 2019, https://arxiv.org/abs/1908.09649 (Year: 2019).*

Heise, Peter, Geyer, Fabien, Obermaisser, Roman, "TSimNet: An industrial Time Sensitive Networking simulation framework based on OMNeT++" Dec. 22, 2016, https://ieeexplore.ieee.org/document/7792488 (Year: 2016).*

Oliver, Ramon Serna, Craciunnas, Silviu S., Steiner Wilfried, "IEEE 802.1Qbv Gate Control List Synthesis using Array Theory Encoding" Aug. 9, 2018, https://ieeexplore.ieee.org/document/8430062 (Year: 2018).*

Nasrallah, Ahmed, Balasubramanian, Vekatraman, Thyagaturu, Akhilesh, Reisslein, Martin, ElBakoury, Hesham, "Reconfiguration Algorithms for High Precision Communications in Time Sensitive Networks: Time-Aware Shaper Configuration with IEEE", Jun. 27, 2019, https://ieeexplore.ieee.org/document/9024705 (Year: 2019).*

Ansah, Frimpong, Abid, Mohamed Amine, de Meer, Hermann, "Schedulability Analysis and GCL Computation for Time-Sensitive Networks" Jan. 30, 2020, https://ieeexplore.ieee.org/document/8971965 (Year: 2020).*

Cisco, "Time-Sensitive Networking: A Technical Introduction White Paper" 2017, https://www.cisco.com/c/dam/en/us/solutions/collateral/industry-solutions/white-paper-c11-738950.pdf (Year: 2020).*

Notice of Allowance and Fee(s) Due for U.S. Appl. No. 15/647,207 (dated Jan. 15, 2020).

Advisory Action and AFCP 2.0 Decision for U.S. Appl. No. 15/647,207 (dated Nov. 27, 2019).

Final Office Action for U.S. Appl. No. 15/647,207 (dated Sep. 12, 2019).

Non-Final Office Action for U.S. Appl. No. 15/647,207 (dated May 15, 2019).

Notice of Allowance and Fee(s) Due for U.S. Appl. No. 15/498,452 (dated May 10, 2019).

Alhady et al., "Time-aware Traffic Shaper using Time-based Packet Scheduling in Intel I210," International Journal of Research and Engineering, vol. 5, No. 9, pp. 494-499 (Sep.-Oct. 2018).

Non-Final Office Action for U.S. Appl. No. 15/498,452 (dated Nov. 5, 2018).

"Time-Sensitive Networking," Wikipedia, the free encyclopedia, https://en.wikipedia.org/wiki/Time-Sensitive_Networking, pp. 1-7 (Aug. 29, 2017).

Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).

"IEEE Standard for Local and metropolitan area networks—Bridges and Bridged Networks—Amendment 29: Cyclic Queuing and Forwarding," IEEE Computer Society, IEEE Std 802.1QchTM—2017, pp. 1-28 (May 18, 2017).

"IEEE Standard for Local and metropolitan area networks—Bridges and Bridged Networks—Amendment 26: Frame Preemption," IEEE Computer Society, IEEE Std 802.1QbuTM—2016, pp. 1-51 (Jun. 30, 2016).

"IEEE Standard for Local and metropolitan area networks—Bridges and Bridged Networks—Amendment 25: Enhancements for Scheduled Traffic," IEEE Computer Society, IEEE Std 802.1QbvTM—2015, pp. 1-55 (Dec. 5, 2015).

Wisniewski et al., "Seamless Schedule Switching in Time Triggered Ethernet based Communication Systems," ResearchGate, pp. 1-11 (Nov. 2015).

"IEEE Standard for Local and metropolitan area networks—Bridges and Bridged Networks—Amendment 24: Path Control and Reservation," IEEE Computer Society, IEEE Std 802.1QcaTM—2015, pp. 1-105 (Sep. 3, 2015).

Thangamuthu et al., "Analysis of Ethernet—Switch Traffic Shapers for In-Vehicle Networking Applications," Design, Automation & Test in Europe Conference & Exhibition, pp. 1-6 (2015).

Thangamuthu, S., Analysis of Automotive Traffic Shapers in Ethernet In-Vehicular Networks, Eindhoven University of Technology, pp. 1-89 (2014).

Boiger, "Deterministic Ethernet—IEEE 802.1 standards for real-time process control, industrial automation, and vehicular networks," IEEE 802 Tutorial, pp. 1-72 (Nov. 12, 2012).

Boiger, "Time Aware Shaper," Deggendorf University of Applied Sciences, IEEE 802.1 Pleanry, pp. 1-12 (Sep. 2012).

Boiger, Christain, "Time Aware Shaper," IEEE 802 Plenary, Deggendorf University of Applied Sciences, pp. 1-9 (May 2012).

Spirent, "Precision Time Protocol (PTP) IEEE 1588," YouTube "alantalkstech", https://www.youtube.com/watch?v=yw-gd01aOYg, pp. 1-11 (Dec. 7, 2011).

"IEEE Standard for Local and metropolitan area networks—Timing and Synchronization for Time-Sensitive Applications in Bridged Local Area Networks," IEEE Computer Society, IEEE Std 802.1ASTM—2011, pp. 1-274 (Mar. 30, 2011).

Eidson, "IEEE-1588 Standard for a Precision Clock Synchronization Protocol for Networked Measurement and Control Systems—A Tutorial," Agilent Technologies, pp. 1-94 (Oct. 2005).

Notice of Publication for Great Britain Application No. GB2100371.0 (dated Sep. 20, 2021).

First Office Action for Great Britain Application No. GB2100371.0 (dated Aug. 6, 2021).

Notice of Allowance and Fee(s) Due for Chinese Patent Application No. 201810373215.5 (dated Aug. 18, 2021).

Non-Final Office Action for U.S. Appl. No. 17/001,614 (dated Apr. 23, 2021).

First Office Action for Chinese Patent Application No. 201810373217.5 (dated Feb. 2, 2021).

(56) References Cited

OTHER PUBLICATIONS

Advisory Action for U.S. Appl. No. 16/258,485 (dated Nov. 19, 2020).

Parry et al., "A Network Forensics Tool for Precise Data Packet Capture and Replay in Cyber-Physical Systems," ACSW '16 Multiconference, pp. 1-10 (Feb. 2-5, 2016).

* cited by examiner

METHODS, SYSTEMS, AND COMPUTER READABLE MEDIA FOR MEASURING SCHEDULE UPDATE TIME FOR A TIME AWARE SHAPER IMPLEMENTATION

TECHNICAL FIELD

The subject matter described herein relates to measuring performance of network nodes in time sensitive networks. More particularly, the subject matter described herein relates to methods, systems, and computer readable media for measuring schedule update time for a time aware shaper implementation.

BACKGROUND

Ethernet has become the de-facto data networking technology. It has been tested over time and has gained dominance in data communication. Today, Ethernet is being extended to industrial networks where robots, machines, and sensors communicate among themselves to take some action collectively. To be suitable for industrial networks, Ethernet needs to overcome some of its weakness. One set of improvements in Ethernet to make Ethernet suitable for industrial networks is referred to as Time Sensitive Networking (TSN). Out of the various TSN standards that help Ethernet overcome its drawbacks, IEEE 802.1Qbv—Enhancements for Scheduled Traffic (also known as Time Aware Shaper) has become important. IEEE 802.1Qbv provides scheduling across bridges for time critical application traffic. This ensures predictable and low latency end-to-end paths for industrial and in-vehicle applications that require precise communication.

For example, the speed at which an 802.1Qbv implementation can adapt to a configuration change and accurately measuring the time required to implement and 802.1Qbv configuration change are important. Accordingly, there is a need for methods, systems, and computer readable media for measuring schedule update time for a time aware shaper implementation.

SUMMARY

A method for measuring a schedule update time of a time aware shaper device under test (DUT) includes providing an emulated time aware shaper centralized network configuration (CNC) node, an emulated time aware shaper talker, and an emulated time aware shaper listener. The method further includes configuring the time aware shaper DUT with a first configuration that blocks traffic from at least one gate of the DUT. The method further includes transmitting traffic from the emulated time aware shaper talker to the emulated time aware shaper listener via the DUT and confirming the blocking of the traffic from the at least one gate of the DUT. The method further includes transmitting, from the emulated CNC node to the DUT, a second configuration, where the second configuration opens the at least one gate of the DUT that was closed by the first configuration to allow traffic from the at least one gate. The method further includes recording a time T1 of transmission of the second configuration to the DUT. The method further includes detecting traffic from the at least one gate opened by the second configuration at the emulated time aware shaper listener. The method further includes recording a time T2 of receipt of the traffic at the emulated time aware shaper listener. The method further includes calculating a response time of the DUT to the second configuration based on T1 and T2.

According to another aspect of the subject matter described herein, the emulated time aware shaper CNC node comprises an emulated 802.1Qbv CNC node.

According to yet another aspect of the subject matter described herein, configuring the DUT with the first configuration includes transmitting the first configuration from the emulated time aware shaper CNC node to the DUT. The method of claim 1 wherein transmitting the second configuration to the DUT includes transmitting the second configuration via a Netconf, Yang, or representational state transfer (REST) interface.

According to yet another aspect of the subject matter described herein, the method for measuring the schedule update time of the time aware shaper DUT includes, prior to transmitting the second configuration, confirming the blocking of traffic from the at least one gate of the DUT.

According to yet another aspect of the subject matter described herein, the first configuration comprises a first gate control list and the second configuration comprises a second gate control list having at least one open gate that is closed in the first gate control list.

According to yet another aspect of the subject matter described herein, the response time comprise a time for the DUT to respond to a dynamic configuration change.

According to yet another aspect of the subject matter described herein, calculating the response time includes calculating response time using the following equation: response time=$T2-T1-(Pdelay^{T1}+Pdelay^{T2})$, where $Pdelay^{T1}$ is a wire delay between the emulated talker and the DUT and $Pdelay^{T2}$ is a wire delay between the DUT and the emulated listener.

According to yet another aspect of the subject matter described herein, the method for measuring the schedule update time of the time aware shaper DUT comprises repeatedly transmitting configuration changes to the DUT and measuring the response time of the DUT to each configuration change.

According to yet another aspect of the subject matter described herein, the emulated CNC node, the emulated talker, and the emulated listener are components of a network equipment test device and connect to the DUT through different ports of the network equipment test device.

According to yet another aspect of the subject matter described herein, the time aware shaper DUT comprises a time aware shaper bridge.

According to yet another aspect of the subject matter described herein, a system for measuring a schedule update time of a time aware shaper device under test (DUT) is provided. The system includes an emulated time aware shaper centralized network configuration (CNC) node. The system further includes an emulated time aware shaper talker, the system further includes an emulated time aware shaper listener. The system further includes a test controller. The emulated time aware shaper CNC node configures the DUT with a first configuration that blocks traffic from at least one gate of the DUT, the emulated time aware shaper talker sends traffic to the emulated time aware shaper listener via the DUT. The emulated CNC node confirms blocking of the traffic from the at least one gate of the DUT and transmits a second configuration to the DUT. The second configuration opens the at least one gate of the DUT that was closed by the first configuration to allow traffic from the at least one gate. The emulated CNC node records a time T1 of transmission of the second configuration to the DUT. The emulated time aware shaper listener detects traffic from the at least one gate opened by the second configuration and records a time T2 of receipt of the traffic at the emulated time aware shaper listener. The test controller calculates a response time of the DUT to the second configuration based on T1 and T2.

According to yet another aspect of the subject matter described herein, the emulated time aware shaper CNC node transmits the first configuration to the DUT.

According to yet another aspect of the subject matter described herein, the emulated time aware shaper CNC node transmits the second configuration to the DUT via a Netconf, Yang, or representational state transfer (REST) interface.

According to yet another aspect of the subject matter described herein, the test controller is configured to calculate the response time using the following equation: response time=T2−T1−(Pdelay$^{T1}$+Pdelay$^{T2}$), where Pdelay$^{T1}$ is a wire delay between the emulated talker and the DUT and Pdelay$^{T2}$ is a wire delay between the DUT and the emulated listener.

According to yet another aspect of the subject matter described herein, the emulated time aware shaper CNC node repeatedly transmits configuration changes to the DUT and the test controller measures the response time of the DUT to each configuration change.

According to yet another aspect of the subject matter described herein, the system comprises a network equipment test device, wherein the emulated CNC node, the emulated talker, and the emulated listener are components of the network equipment test device and connect to the DUT through different ports of the network equipment test device.

According to another aspect of the subject matter described herein, a non-transitory computer readable medium having stored thereon executable instructions that when executed by a processor of a computer control the computer to perform steps. The steps include providing an emulated time aware shaper centralized network configuration (CNC) node, an emulated time aware shaper talker, and an emulated time aware shaper listener. The steps further include configuring a time aware shaper device under test (DUT) with a first configuration that blocks traffic from at least one gate of the DUT. The steps further include transmitting traffic from the emulated time aware shaper talker to the emulated time aware shaper listener via the DUT. The steps further include confirming the blocking of the traffic from the at least one gate of the DUT. The steps further include transmitting, from the emulated CNC node to the DUT, second configuration, where the second configuration opens at least one gate of the DUT that was closed by the first configuration to allow traffic from the at least one gate. The steps further include recording a time T1 of transmission of the second configuration to the DUT. The steps further include detecting traffic from the at least one gate opened by the second configuration at the emulated time aware shaper listener. The steps further include recording a time T2 of receipt of the traffic at the emulated time aware shaper listener. The steps further include calculating a response time of the DUT to the second configuration based on T1 and T2.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Conventional Ethernet is best effort service, i.e. a packet originated from an ingress node reaches its destination in best effort manner. In "best effort manner" packet may reach the destination, there is no predictability of how much time the packet will take to reach the destination, or it may not reach at all. The reason for this unpredictability is that the outgoing queue of a switch might be full already. So additional incoming packets may get queued or may get dropped or may get delayed.

To overcome the bottleneck of conventional Ethernet, IEEE 802.1Qbv or time aware shaper is used to correctly allow frames to egress from a device which are intended for transmission at a specific point of time.

IEEE 802.1Qbv describes time gated queues at egress port of a device which open/close at specific time intervals to ensure transmission of intended frames and disallowing frames which are not slated to be transmitted.

Figure 1:
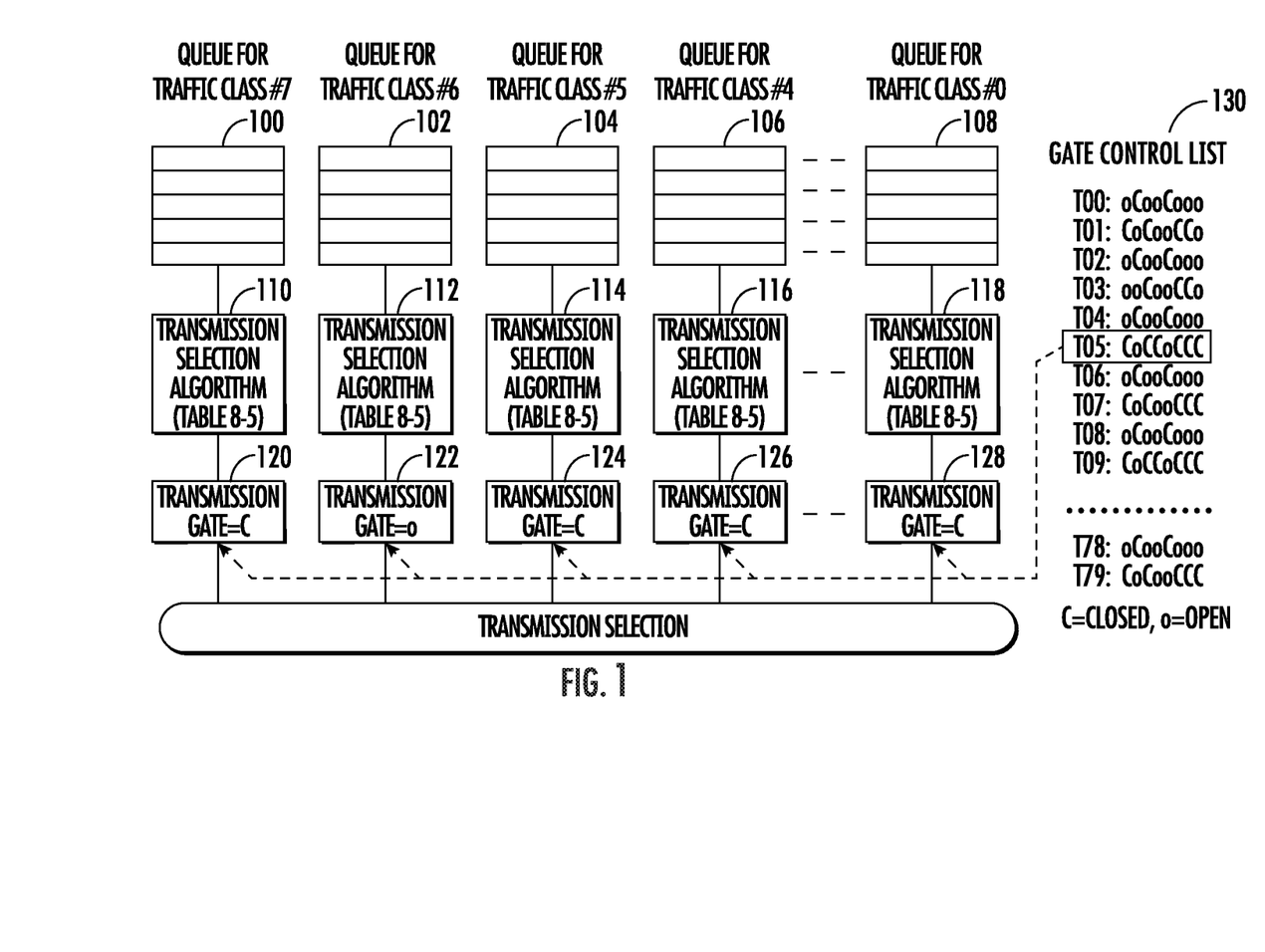
FIG. 1 is a diagram illustrating exemplary queues and gates of a device, such as an 802.1Qbv bridge.

FIG. 1 is a block diagram illustrating an exemplary egress queue and gate structure of a time aware shaper node, such as an 802.1Qbv bridge. Referring to FIG. 1, a plurality of traffic queues 100, 102, 104, 106, and 108 carry traffic of different classes. Packets are scheduled from each queue by one of the plurality of transmissions selection algorithms 110, 112, 114, 116, and 118. Each queue also includes a transmission gate 120, 122, 124, 126, and 128, which determines whether or not packets are allowed to be transmitted from the given queue. If the gate for a given queue is open, traffic is allowed, if the gate for a given queue is closed, traffic is not allowed to pass. A gate control list 130 controls whether or not traffic is allowed from the particular queue. The gate control list consists of a series of entries at different times that indicate which gates are opened and which gates are closed. In the illustrated example, at time TOO, the gate control list entry of oCooCoo indicates that two of the gates are closed and the remaining are open. It is desirable to measure the response time of a time aware shaper node, such as an 802.1Qbv bridge, to changes in configuration, such as changes in a gate control list.

Each gate maps uniquely to one of the queues present at the port under transmission for the device (egress port). For the sake of simplicity this document assumes that there is one to one mapping between the time-gates and the queues. Also, each queue can be assigned a unique priority similar to a VLAN priority which is used to determine which TSN streams are designated for a specific queue.

As stated above, transmission gates 120, 122, 124, 126, and 128 can be in any one of the following two states:
 a) Open: Queued frames are selected for transmission, in accordance with the definition of the transmission selection algorithm associated with the queue.
 b) Closed: Queued frames are not selected for transmission.

As described above, 802.1Qbv uses time gated queues so that predictability of traffic delivery can be assured in a time sensitive network. In an industrial Ethernet based network, deploying TSN standards is often complex. One needs to constantly monitor the dynamic changes that are happening in the network and provision the TSN aware switches accordingly so that the switches can adapt to the dynamic changes accurately. Different consortiums together have come up with an architecture (IEEE P802.1Qcc configuration models) which helps solve this dynamic configuration changes in the network more efficiently.

Figure 2:
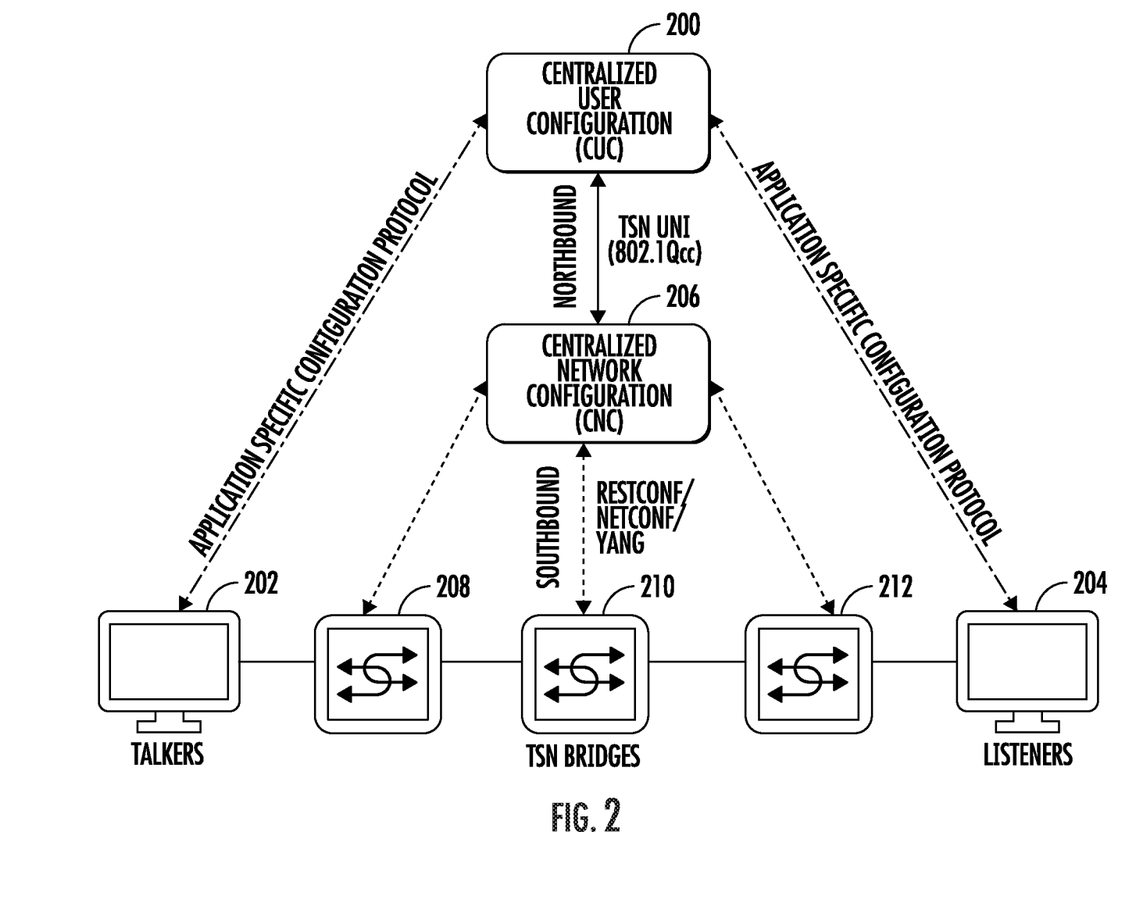
FIG. 2 is a network diagram illustrating exemplary nodes involved in implementing 802.1Qbv.

FIG. 2 illustrates an example configuration architecture for an 802.1Qbv network. Referring to the architecture in FIG. 2, a centralized user configuration (CUC) node 200 sends application specific configuration protocol commands to 802.1Qbv talkers 202 and 802.1Qbv listeners 204 to configure the applications to send traffic to each other. In order to send such configurations, CUC node 200 discovers talkers 202 and listeners 204 and their TSN stream requirements. A centralized network configuration (CNC) node 206 discovers network topology and bridge capabilities. CNC node 206 sends configuration commands to 802.1Qbv bridges 208, 210, and 212 it is the response time of bridges 208, 210, and 212 to configuration commands from CNC node 206 that the subject matter described herein is designed to measure.

In summary, the architecture illustrated in FIG. 2, also referred to as the fully centralized architecture, involves the following entities:
 CNC node 206—This entity is responsible for configuring TSN aware bridges/switches connected to it. The configuration can be done while the entire network is coming up or there could be dynamic changes into the network as well which will trigger CNC node 206 to convey the same to the TSN bridges. This communication is called southbound communication and done on top of a Netconf session (usually). It also leverages YANG models as a basis for exchanging information.
 CUC node 200—This entity is responsible for discovering end stations, retrieving end station capabilities and configuring end stations based on applicable TSN capabilities. The protocols that CUC node 200 uses to configuring end stations are mostly user application specific, primitives like Open Platform Communications/Unified Architecture (OPC/UA) and Profinet are few examples which are used in this case.
 Talkers 202, Listeners 204, and TSN bridges 208, 210, and 212—Talkers 202 and listeners 204 are specifically the end stations which are responsible for generating and receiving network traffic. TSN bridges 208, 210, and 212 are responsible for forwarding network traffic according to TSN protocols configured within it. TSN bridges 208, 210, and 212 can be configured by a CNC to support TSN shaping protocols, such as credit-based Shaper, time aware shaper, etc.

The fully centralized network model is being adopted by both automotive and industrial segments for deploying the network. Although the fully centralized network model brings in lot of flexibility in terms of dynamic configuration updates happening within a network still there are areas which needs to be thoroughly monitored for ensuring robustness of the network.

A TSN bridge needs to adhere to the time aware shaper (IEEE 802.1Qbv) implementation stringently in order to ensure that its able to maintain the timeliness of the time critical traffic within the network. In case of a fully centralized network, the dynamic schedule updates are generated by the CNC based on the network requirements as well as network load at a point of time. A TSN bridge upon receiving such dynamic configuration changes needs to update its currently running gate control list definitions and attach to the updated gate control list quickly. How fast a TSN switch adapts to the new change ensures how quickly the new changes happening in a network are followed. Any delay incurred by a bridge while adopting the new configuration update can introduce a significant anomaly in the network.

Figure 3:
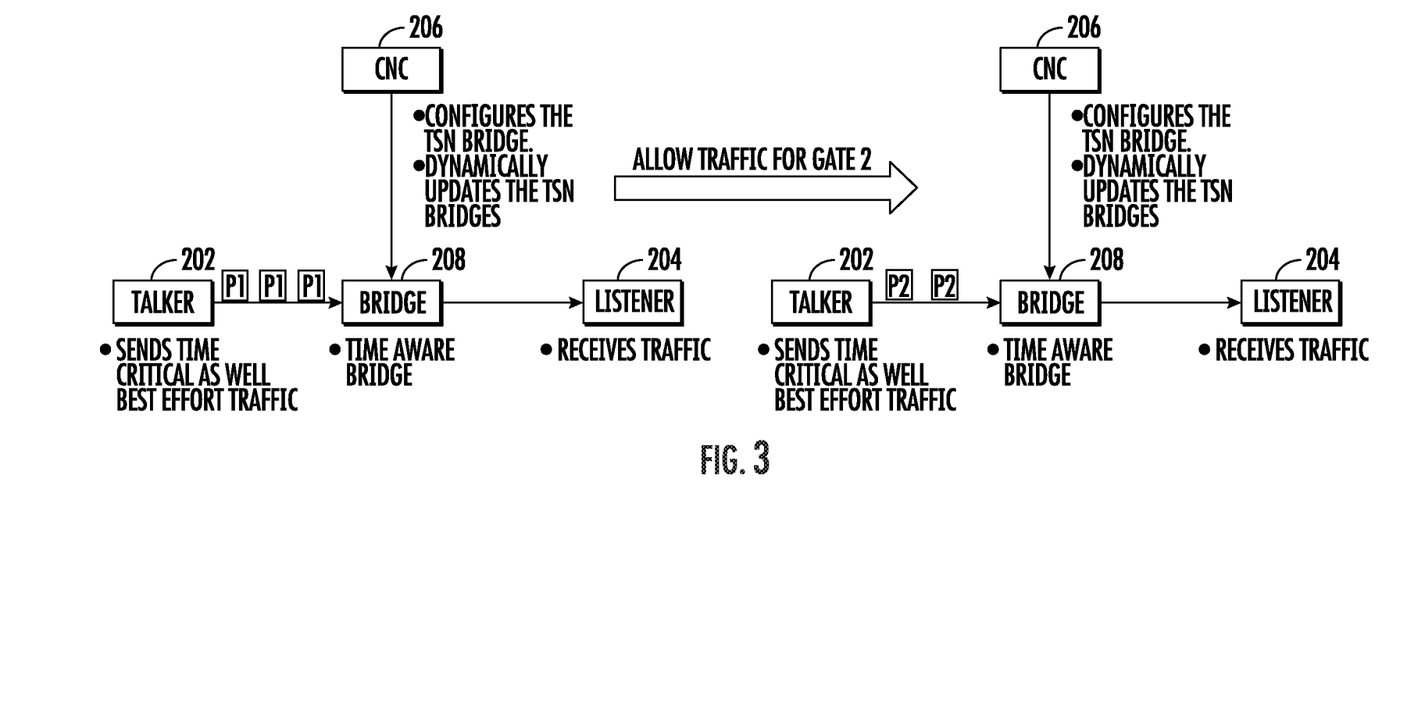
FIG. 3 is a network diagram illustrating a configuration change in an 802.1Qbv network.

FIG. 3 illustrates a configuration change in a time sensitive network. In FIG. 3, the diagram on the left illustrates the state of the network before a configuration change, and the diagram to the right illustrates the state of the network after a configuration change.

In the scenario illustrated in FIG. 3, a time aware shaper bridge 208 is controlled by a CNC node 206, and CNC node 206 sends configuration updates over Netconf/RestConf. Initially, bridge 208 was configured with a gate control list which only allowed traffic mapped with queue 2 of the bridge to pass 50% of the cycle time. Due to a dynamic change in traffic profile taking place in the network there is a need of allowing traffic mapped with queue 3 and 4 to pass 25% of cycle time accordingly. This update will be conveyed by CNC node 206 to the time aware shaper bridge 208 in form of a schedule update, and bridge 208 needs to adhere to the new configuration within a threshold of few microseconds (depending on the cycle time elapsed).

One problem lies with the accuracy of bridge to update its schedule based on the dynamic update, if the bridge fails to update itself within the threshold of a predefined cycle time, the bridge can adversely affect the time sensitivity of the entire network. If the bridge is too late in updating itself, the bridge will not allow the new traffic to flow through and thereby cause urgent as well as sensitive sensor information to get delayed. The subject matter described herein provides a methodology which can be leveraged for testing and quantifying how accurate a time aware bridge can update itself to the dynamic changes taking place inside of a time sensitive network.

In the previous sections we have seen how industrial Ethernet is moving into fully centralized networking model. We have noticed the need for a time aware device to be compliant to the dynamic changes taking place in a network within a threshold parameter. In this section we would introduce the methodology for measuring the accuracy of device for remaining compliant to the update.

Figure 4:
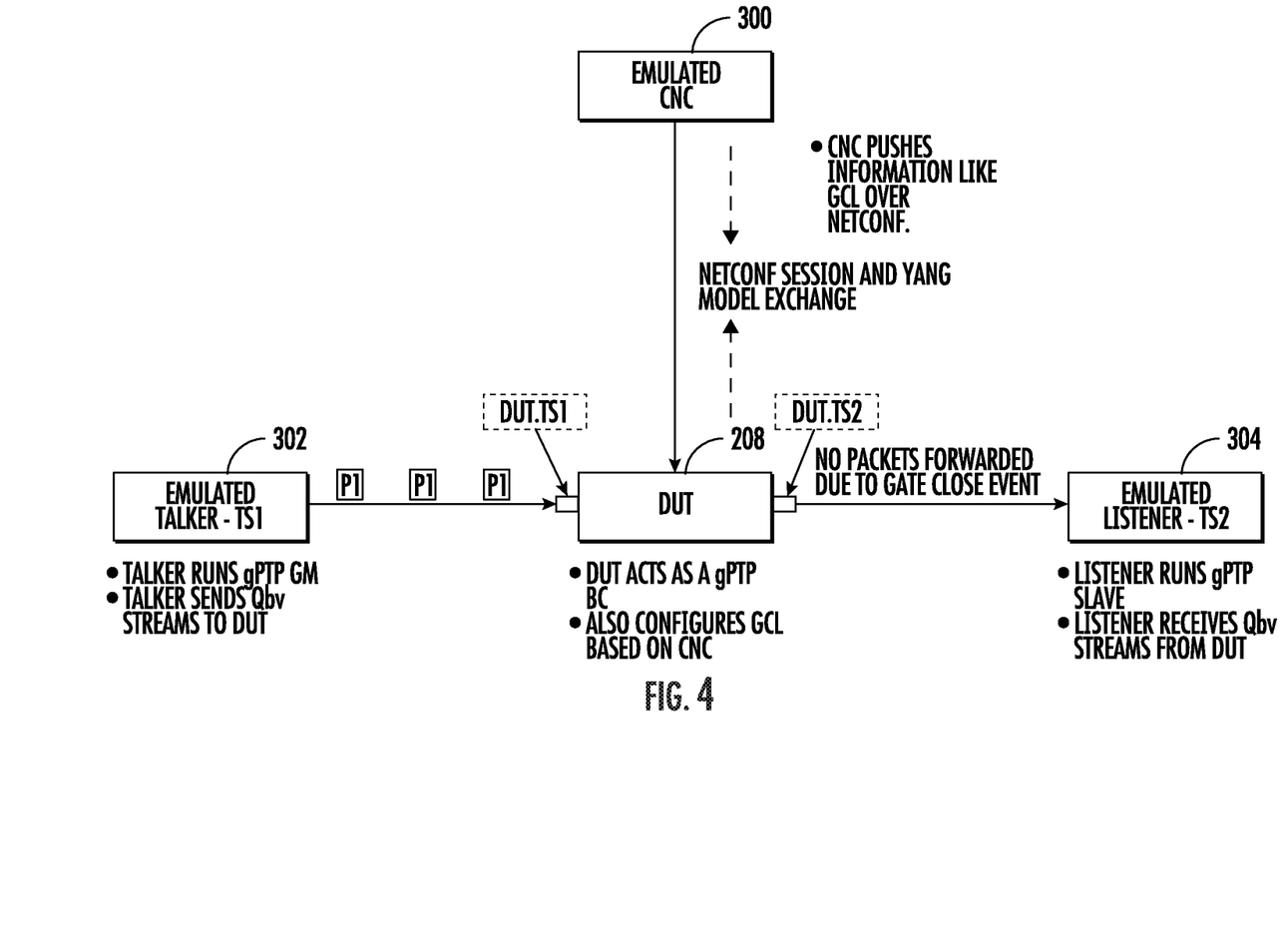
FIG. 4 is a network diagram illustrating an initial configuration of an 802.1Qbv device under test associated with a methodology for measuring a response time of the DUT to a configuration change.

FIG. 4 illustrates a test system and exemplary messaging for initially configuring a DUT for measuring the response time of the DUT to a configuration change, such as a new gate control list from a CNC node. In FIG. 4, emulated CNC node 300 is an emulated 802.1Qbv CNC node that emulates the configuration protocols of an 802.1Qbv CNC node. In the illustrated example, the configuration protocols are Netconf and Yang. The commands transmitted over the configuration protocols include 802.1Qbv configuration data, such as gate control lists. The experimental setup also includes Test stations identified as test station 1 (TS1) 302, and test station 2 (TS2) 304. The Test Stations are connected to DUT 208 at ports identified as DUT.TS1 and DUT.TS2. TS1 302 is responsible for transmitting frames to the device under test, and TS2 304 is responsible for receiving frames from DUT.TS2. The test scenario assumes that both test stations TS1 302 and TS2 304 along with DUT 208 are synchronized with help of 802.1AS (gPTP) emulation. There is another test port connected to the management interface of DUT 208, which emulates a CNC. This test port is responsible for exchanges messages over a Netconf/Restconf channel which will configure DUT 208. All the three test ports are part of the same test system which ensures pre-existing time synchronization amongst all three of them.

Test Step 1—Initialization

In the first test step (as illustrated in FIG. 4), DUT 208 is configured with a gate control list (or schedule) which does not allow traffic destined for queue 1 (mapped with priority 1). Test station TS1 302 starts sending traffic destined for queue 1 and all the packets are dropped by device under test 208, as the gate for queue 1 is closed. Test station TS2 304 reports 100% frame loss for frames targeted for queue 1.

Test Step 2—Computation

Figure 5:
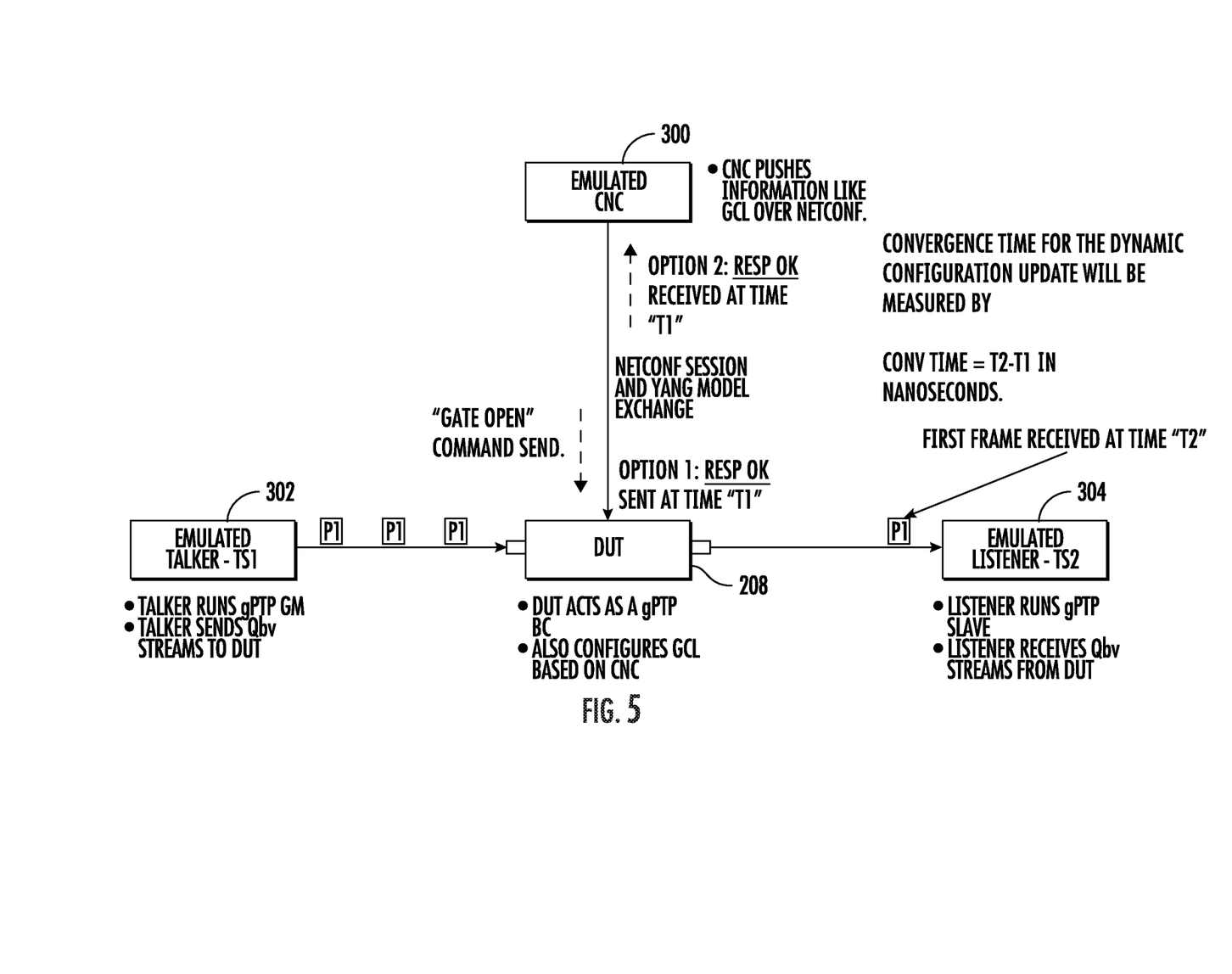
FIG. 5 is a network diagram illustrating exemplary messaging associated with a configuration change of the DUT in FIG. 4 and measuring the response time of the DUT to the configuration change.

After the initialization stage illustrated in FIG. 4, a configuration change is transmitted from emulated CNC node 300 to DUT 208, and the response time of DUT 208 to implement the configuration change is measured. FIG. 5 illustrates this scenario. Referring to FIG. 5, the steps are assumed to be performed after the test step 1 in which the gate for queue 1 of DUT 208 illustrated in FIG. 4 is closed. In step 2 we perform the following, Step 2.1—Ensure that DUT 208 is synchronized with the test system (both TS1, TS2) with the help of a time synchronization primitive (preferably 802.1AS).

Step 2.2—Ensure that no traffic is flowing from the DUT 208 to TS2 304.

Step 2.3—From emulated CNC node 300, push a configuration update to DUT 208. The new configuration update now allows traffic to flow from DUT.TS2 to tester TS2 304.

Step 2.4—At emulated CNC node 300, record the response time of the configuration push message. There can be two ways of recording the time.
  a. DUT 208 sends the response to the configuration update message with the response sent timestamp.
  b. emulated CNC node 300 records the time when it receives the "Response" back from the DUT indicating that the request has been successfully executed. Let's assume this timestamp as "T1" (see FIG. 5).

Step 2.5—As the schedule update command is successfully executed, DUT 208 starts adhering to the new schedule update and starts forwarding frame destined for queue 1, which now is open. At TS2 304, the first frame destined for queue 1 from DUT 208 gets captured at time "T2" (see FIG. 5).

Step 2.6—After step 2.5, the following two timestamps are available to emulated CNC node 300 and usable to calculate the response time of DUT 208 to the configuration change.

T1—This is time when the device responded back to emulated CNC node 300 with "Response_OK" which signifies that it has implemented the update.

T2—This is the time when the first packet is received from the device 208 for the queue which was closed until step 2.4.

Another factor that needs to be considered is the wire length delay between the DUT and the talker and between the DUT and the listener.

1. Wire length delay between DUT and tester—let's consider it to be $Pdelay^{T1}$
2. Wire length delay between DUT.TS2 and TS2—let's consider it to be $Pdelay^{T2}$ Step 2.7—So the equation for the schedule update time now becomes, Schedule Update Time=$T2-T1-(Pdelay^{T1}+Pdelay^{T2})$ The unit for the schedule update time can be in nanoseconds or microseconds based on the accuracy needed for a particular application.

Similar steps can be repeated for all the gates available in the device under test and for other dynamic updates as well.

The "schedule update time" exactly measures the amount of time taken by the device to update itself with the new configuration and then reflecting the changes in its "GATE" interval calculation.

Figure 6:
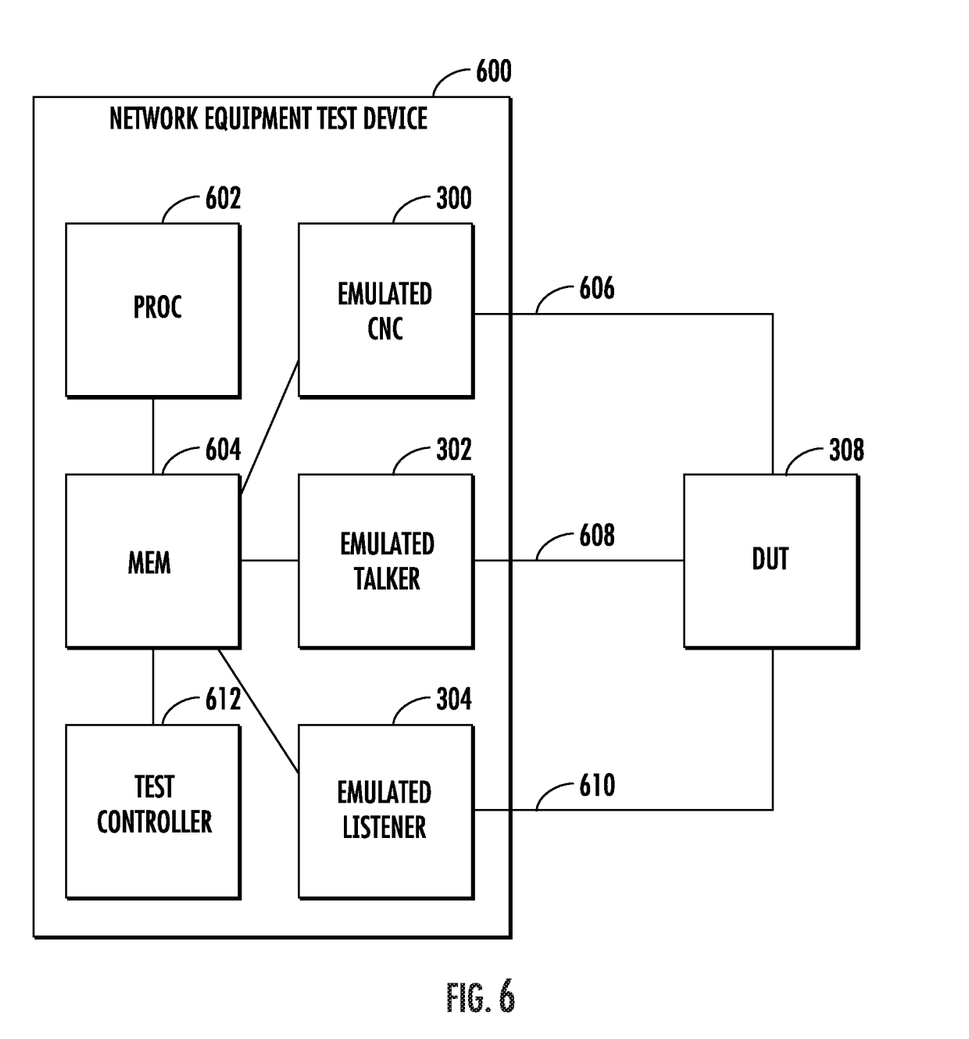
FIG. 6 is a block diagram of an exemplary system for measuring a schedule update time for a time aware shaper implementation.

FIG. 6 is a block diagram illustrating an exemplary network equipment test device to implementing the test architecture illustrated in FIGS. 4 and 5. Referring to FIG. 6, a network equipment test device 600 includes at least one processor 602, a memory 604, and a plurality of test ports 606, 608, and 610. In the illustrated example, emulated CNC node 300 is implemented at test port 606 of network equipment test device 600, emulated talker 302 is implemented at test port 608 of network equipment test device 600, and emulated listener 304 is implemented at test port 610 of network equipment test device 600. Emulated CNC node 300, emulated talker 302, and emulated listener 304 may be implemented by processor 602 and stored in memory 604 to perform the functions illustrated above with respect to FIGS. 4 and 5 to test the response of DUT 208 to a configuration change.

A test controller 612 controls the overall operation of network equipment test device 600. For example, test controller 612 may allow the user to configure emulated CNC node to send the dynamic configuration updates to DUT 208, to configure emulated talker 302 to transmit traffic to emulated listener 304 via DUT 208, and to configure emulated listener 304 to listen and report the time of receipt of traffic from emulated talker 302. Test controller 612 may also calculate the response time of DUT 208 to dynamic configuration changes.

Figure 7:
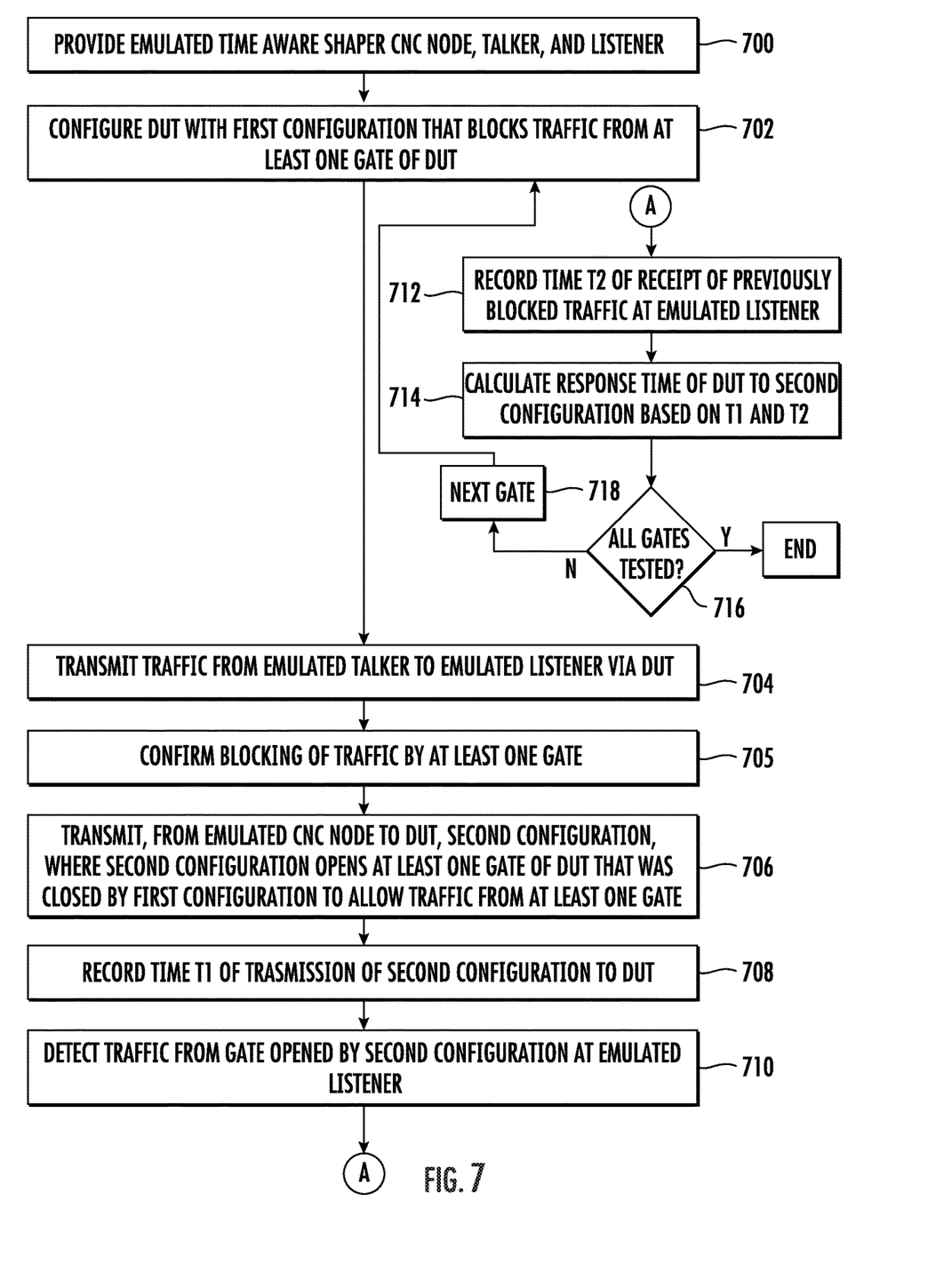
FIG. 7 is a flow chart illustrating an exemplary process for measuring a schedule update time for a time aware shaper implementation.

FIG. 7 is a flow chart illustrating an exemplary process for testing the response time of a time shaper aware DUT to a configuration change. Referring to FIG. 7, in step 700, the process includes providing an emulated time aware shaper CNC node, talker, and listener. For example, a network equipment test device, such as network equipment test device 600 illustrated in FIG. 6, may implement emulated CNC node 300, emulated talker 302, and emulated listener 304 at different ports for testing the functionality of a device under test 208, such as a time aware shaper bridge.

In step 702, the process includes configuring the DUT with a first configuration that blocks traffic from at least one gate of the DUT. Configuring the DUT may include transmitting the first configuration from the emulated CNC node to the DUT. For example, emulated CNC node 300 may transmit configuration commands to DUT 208 to instruct DUT 208 to block traffic on one of its egress gates (see FIG. 1). The configuration commands may include a gate control list that indicates which gates of DUT 208 are to be blocked. In one example, the first configuration blocks all gates of DUT 208.

In step 704, the process includes sending traffic from the emulated talker to the emulated listener via the DUT. For example, network equipment test device 600 may configure emulated talker 302 to send traffic to listener 304 via DUT 208 and start sending the traffic. The traffic may be any suitable test traffic, such as application traffic that would be found in a time sensitive network. One example of such traffic would be emulated traffic that would be transmitted between industrial machines or automobiles for real time control.

In step 705, the process includes confirming the blocking of traffic by at least one gate of the DUT. For example, emulated listener 304 may report that application traffic from the gate of DUT 208 that was blocked by the first configuration data is not being received.

In step 706, the process includes transmitting, from the emulated CNC to the DUT, a second configuration, where the second configuration allows traffic from the at least one gate of the DUT that was closed by the first configuration to allow traffic from the at least one gate. For example, emulated CNC node 300 may transmit an updated configuration to DUT 208 that provides a new gate control list to open one or more gates 208 to allow previously blocked traffic from emulated talker 302 to emulated listener 304.

In step 708, the process includes recording the time T1 of transmission of the second configuration to the DUT. For example, emulated CNC node 300 may time stamp the transmission of the second configuration to DUT 208 and record the time stamp in memory 604.

In step 710, the process includes detecting traffic from the gate opened by the second configuration at the emulated listener. For example, emulated listener 304 may detect when the first packet from the previously closed gate is received from DUT 208.

In step 712, the process includes recording the time T2 of receipt of the previously blocked traffic at the emulated listener. For example, emulated listener 304 may generate a time stamp corresponding to the time of receipt of the first packet that was previously blocked from DUT 208 and record the time stamp in memory 604.

In step 714, the process includes calculating a response time of the DUT to the configuration change based on the time stamps T1 and T2. For example, test controller 612 may calculate the response time based on the difference in T1 and T2 and subtracting the wire delay using the equations described above.

In step 716, it is determined whether all gates of the DUT have been tested. If all gates of the DUT have been tested, the process ends. If all gates have not been tested, test controller 612 begins the test process for the next gate in step 718, and control returns to step 702 where steps 702-714 are repeated for the next gate.

Advantages

The methodology described herein for measuring a schedule update time in a network which is dynamic in nature is extremely important as it provides a metric upon which a time aware shaper device can be characterized. For example, a device which shows a high schedule update time might not be the right candidate for deployment in a time sensitive network.

The methodology for measuring a schedule update time described herein characterizes time aware shaper devices in an automated manner.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for measuring a schedule update time of a time aware shaper device under test (DUT), the method comprising:

providing an emulated time aware shaper centralized network configuration (CNC) node, an emulated time aware shaper talker, and an emulated time aware shaper listener;

configuring the time aware shaper DUT with a first configuration that blocks traffic from at least one gate of the DUT;

transmitting traffic from the emulated time aware shaper talker to the emulated time aware shaper listener via the DUT;

confirming blocking of the traffic from the at least one gate of the DUT;

transmitting, from the emulated CNC node to the DUT, a second configuration, where the second configuration opens the at least one gate of the DUT that was closed by the first configuration to allow traffic from the at least one gate;

recording a time T1 of transmission of the second configuration to the DUT;

detecting traffic from the at least one gate opened by the second configuration at the emulated time aware shaper listener;

recording a time T2 of receipt of the traffic at the emulated time aware shaper listener; and calculating a response time of the DUT to the second configuration based on T1 and T2, wherein the DUT comprises a real time aware shaper bridge and wherein the response time comprises a measurement of a time for the real time aware shaper bridge to change a gate control list of the real time aware shaper bridge from the first configuration to the second configuration.

2. The method of claim 1 wherein the emulated time aware shaper CNC node comprises an emulated 802.1Qbv CNC node.

3. The method of claim 1 wherein configuring the DUT with the first configuration includes transmitting the first configuration from the emulated time aware shaper CNC node to the DUT.

4. The method of claim 3 wherein transmitting the second configuration to the DUT includes transmitting the second configuration via a Netconf, Yang, or representational state transfer (REST) interface.

5. The method of claim 1 wherein the first configuration comprises a first gate control list and the second configuration comprises a second gate control list having at least one open gate that is closed in the first gate control list.

6. The method of claim 1 wherein the response time comprises a time for the DUT to respond to a dynamic configuration change from the emulated time aware shaper CNC node.

7. The method of claim 1 wherein calculating the response time includes calculating response time using the following equation:

$$\text{response time} = T2 - T1 - (\text{Pdelay}^{T1} + \text{Pdelay}^{T2}),$$

where $\text{Pdelay}^{T1}$ is a wire delay between the emulated talker and the DUT and $\text{Pdelay}^{T2}$ is a wire delay between the DUT and the emulated listener.

8. The method of claim 1 comprising repeatedly transmitting configuration changes to the DUT and measuring the response time of the DUT to each configuration change.

9. The method of claim 1 wherein the emulated CNC node, the emulated talker, and the emulated listener are components of a network equipment test device and connect to the DUT through different ports of the network equipment test device.

10. A system for measuring a schedule update time of a time aware shaper device under test (DUT), the system comprising:
an emulated time aware shaper centralized network configuration (CNC) node for configuring the DUT with configurations for blocking or allowing forwarding of traffic from a plurality of gates of the DUT;
an emulated time aware shaper talker;
an emulated time aware shaper listener; and
a test controller,
wherein the emulated time aware shaper CNC node configures the DUT with a first configuration for blocking traffic from at least one gate of the DUT and configures the emulated time aware shaper talker to start sending traffic to the emulated time aware shaper listener via the DUT, the emulated time aware shaper starts the sending of the traffic to the emulated time aware shaper listener via the DUT, and the emulated time aware shaper listener confirms blocking of traffic from the at least one gate of the DUT,
wherein the emulated time aware shaper CNC node transmits a second configuration to the DUT, wherein the second configuration opens at least one gate of the DUT that was closed by the first configuration to allow traffic from the at least one gate, and wherein the emulated time aware shaper CNC node records a time T1 of transmission of the second configuration to the DUT,
wherein the emulated time aware shaper listener detects traffic from the at least one gate opened by the second configuration, records a time T2 of receipt of the traffic at the emulated time aware shaper listener, and
wherein the test controller calculates a response time of the DUT to the second configuration based on T1 and T2, wherein the DUT comprises a real time aware shaper bridge and wherein the response time comprises a measurement of a time for the real time aware shaper bridge to change a gate control list of the real time aware shaper bridge from the first configuration to the second configuration.

11. The system of claim 10 wherein the emulated time aware shaper CNC node comprises an emulated 802.1Qbv CNC node.

12. The system of claim 10 wherein the emulated time aware shaper CNC node transmits the first configuration to the DUT.

13. The system of claim 10 wherein the emulated time aware shaper CNC node transmits the second configuration to the DUT via a Netconf, Yang, or representational state transfer (REST) interface.

14. The system of claim 10 wherein the first configuration comprises a first gate control list and the second configuration comprises a second gate control list having at least one open gate that is closed in the first gate control list.

15. The system of claim 10 wherein the response time comprises a time for the DUT to respond to a dynamic configuration change from the emulated time aware shaper CNC node.

16. The system of claim 10 wherein the test controller is configured to calculate the response time using the following equation:

$$\text{response time} = T2 - T1 - (\text{Pdelay}^{T1} + \text{Pdelay}^{T2}),$$

where $\text{Pdelay}^{T1}$ is a wire delay between the emulated talker and the DUT and $\text{Pdelay}^{T2}$ is a wire delay between the DUT and the emulated listener.

17. The system of claim 10 wherein the emulated time aware shaper repeatedly transmits configuration changes to the DUT and the test controller measures the response time of the DUT to each configuration change.

18. The system of claim 10 comprising a network equipment test device, wherein the emulated CNC node, the emulated talker, and the emulated listener are components of the network equipment test device and connect to the DUT through different ports of the network equipment test device.

19. A non-transitory computer readable medium having stored thereon executable instructions that when executed by a processor of a computer control the computer to perform steps comprising:
providing an emulated time aware shaper centralized network configuration (CNC) node, an emulated time aware shaper talker, and an emulated time aware shaper listener;
configuring a time aware shaper device under test (DUT) with a first configuration that blocks traffic from at least one gate of the DUT;
transmitting traffic from the emulated time aware shaper talker the emulated time aware shaper listener via the DUT;
confirming blocking of the traffic from the at least one gate of the DUT;
transmitting, from the emulated CNC node to the DUT, a second configuration, where the second configuration opens at least one gate of the DUT that was closed by the first configuration to allow traffic from the at least one gate;
recording a time T1 of transmission of the second configuration to the DUT;
detecting traffic from the at least one gate opened by the second configuration at the emulated time aware shaper listener;
recording a time T2 of receipt of the traffic at the emulated time aware shaper listener; and
calculating a response time of the DUT to the second configuration based on T1 and T2, wherein the DUT comprises a real time aware shaper bridge and wherein the response time comprises a measurement of a time for the real time aware shaper bridge to change a gate control list of the real time aware shaper bridge from the first configuration to the second configuration.

\* \* \* \* \*